(12) United States Patent
Shimotori et al.

(10) Patent No.: US 7,438,986 B2
(45) Date of Patent: Oct. 21, 2008

(54) FUEL CELL SYSTEM WITH IMPROVED HUMIDIFICATION SYSTEM

(75) Inventors: Soichiro Shimotori, Kawasaki (JP); Yasuji Ogami, Yokohama (JP); Michael L. Perry, South Glastonbury, CT (US)

(73) Assignees: UTC Power Corporation, South Windsor, CT (US); Toshiba Fuel Cell Power Systems Corporation, Minato-ku, Tokyo (JP)

( * ) Notice: Subject to any disclaimer, the term of this patent is extended or adjusted under 35 U.S.C. 154(b) by 845 days.

(21) Appl. No.: 11/022,431

(22) Filed: Dec. 22, 2004

(65) Prior Publication Data
US 2005/0106434 A1 May 19, 2005

Related U.S. Application Data

(62) Division of application No. 10/309,971, filed on Dec. 4, 2002, now Pat. No. 6,869,709.

(51) Int. Cl.
*H01M 8/04* (2006.01)
(52) U.S. Cl. .............................. 429/34; 429/13; 429/25; 429/26
(58) Field of Classification Search ........................ None
See application file for complete search history.

(56) References Cited

U.S. PATENT DOCUMENTS

| 5,260,143 | A | * | 11/1993 | Voss et al. | ..................... 429/13 |
| 2002/0150807 | A1 | * | 10/2002 | Yang | ............................ 429/34 |
| 2004/0142217 | A1 | * | 7/2004 | Couch et al. | ................... 429/13 |

* cited by examiner

*Primary Examiner*—John S Maples
(74) *Attorney, Agent, or Firm*—Henry T. Crenshaw, Jr.

(57) ABSTRACT

A method for operating a fuel cell power plant. The fuel cell can include a reactant passage (22) with an upstream portion and a downstream portion for providing reactant to an electrode (16, 18), at least one liquid passage (24), and a plate (20) made from a porous material that is liquid permeable and conductive. The porous material separates the reactant passage and the liquid passage. A pressure profile is controlled to provide a positive pressure difference in the upstream portion and a negative pressure difference in the downstream portion. A positive pressure difference is one where the liquid pressure is higher than that of the reactant. A negative pressure difference is one where the liquid pressure is less than that of the reactant. The pressure profile can be used to provide enhanced humidification of the reactant in the upstream portion and effective liquid water removal in the downstream portion to maximize both the performance and the life of the fuel cell.

6 Claims, 10 Drawing Sheets

DISTANCE FROM REACTANT INLET

FUEL CELL SYSTEM WITH IMPROVED HUMIDIFICATION SYSTEM

CROSS-REFERENCE TO RELATED APPLICATION(S)

This application is a divisional application of U.S. patent application Ser. No. 10/309,971, filed Dec. 4, 2002 now U.S. Pat. No. 6,869,709, by Shimotori et al. This application claims priority from the 10/309,971 application and incorporates such application by reference in its entirety.

TECHNICAL FIELD

The technical field is fuel cell power plants. More specifically, a fuel cell power plant having a humidification system with a controlled and adjustable pressure profile that simultaneously humidifies incoming reactant and removes excess liquid water from the reactant passages.

BACKGROUND ART

Fuel cell power plants are well known and may be used, for example, as power sources for electrical apparatus in space vehicles, power sources in automotive applications, and as stationary electricity generators for buildings. In a typical fuel cell power plant, multiple fuel cells are arranged together in a repeating fashion to form a cell stack assembly ("CSA"). Each individual fuel cell in the CSA typically includes an anode electrode and a cathode electrode separated by an electrolyte. A reactant fuel (e.g. hydrogen) is supplied to the anode, and a reactant oxidant (e.g. oxygen or air) is supplied to the cathode. The hydrogen electrochemically reacts at a catalyzed area of the membrane or anode to produce hydrogen ions and electrons. The electrons are conducted to the cathode through an external load. The hydrogen ions transfer through the electrolyte to the cathode, where they combine with the oxidant and the electrons to produce water and thermal energy.

In a fuel cell with a proton exchange membrane ("PEM") as the electrolyte, the combination of the electrolyte and the anode and cathode is oftentimes called a membrane electrode assembly ("MEA"). In PEM fuel cells, the membrane must be hydrated in order to obtain optimum membrane performance and membrane life. PEM fuel cells typically operate at about 80 degrees C., and if dry reactant gases are used, the water in the membrane, and that produced by the fuel cell, can evaporate into the gas stream and leave the membrane dehydrated. In order to prevent membrane dehydration, the reactant gasses are frequently humidified using external and or internal humidification means.

External humidifiers humidify the reactant gases prior to supplying the gas to the fuel cells. Internal humidifiers supply water, such as coolant water, directly into the reactant gas passages inside the fuel cells. The reactant and coolant passages are separated by, for example, a porous plate or water permeable membrane. A pressure differential between the coolant and reactant can force part of the coolant water through the plate or membrane and into the reactant passages to humidify the reactant. An advantage to using an internal humidifier is that the fuel cell power plant can be made simpler and more compact than one using external humidifiers. An example of a PEM fuel cell with internal humidification is shown in U.S. Pat. No. 4,826,741, issued to Adlhart et al. on May 2, 1989.

A drawback to internal humidification stems from the difficulty in providing a uniform distribution of water in the CSA. For example, inadequate control of the pressure differential between the coolant and reactant can result in a maldistribution of water, which degrades cell performance. If the coolant pressure is too low humidification can be insufficient, which increases internal ohmic resistance. If the coolant pressure is too high, excess water can enter the gas passages and flood the electrodes.

Another difficulty with internal humidification is controlling the water distribution in the plane of the active area of the MEA. The active area of the MEA is the portion of the membrane (or an adjacent electrode) that is catalyzed, and it is where the electrochemical reaction takes places. If the coolant pressure is sufficient to humidify the upstream region of the active area, water may be excessive in the downstream region, due to the progressive consumption of the reactants and the production of water by the electrochemical reaction. This can result in flooding of the catalyst in the downstream regions. Attempts to decrease the liquid water in the downstream region can involve reducing the humidity of the incoming reactant, but this can lead to membrane drying in the upstream region.

Another difficulty with internal humidifiers is associated with need for transient capability. When a fuel cell is operating, the flow rates (and pressures) of reactant gases will change according to changing or transient load demands placed upon the fuel cell. If the coolant pressure cannot also change, or change as quickly as the reactant pressures, then transient load demands may cause the pressure difference between the coolant and the reactants to increase or decrease to levels where the electrodes flood or the membrane becomes dehydrated.

DISCLOSURE OF THE INVENTION

A method is disclosed for operating a fuel cell power plant having a reactant passage with an upstream portion adjacent a reactant passage inlet, and a downstream portion adjacent a reactant passage outlet, where the reactant passage provides reactant to an electrode, the fuel cell power plant further having at least one liquid passage and a porous material that is liquid permeable and conductive. The porous material separates the reactant passage and the liquid passage. A reactant is flowed into the reactant passage, and a liquid is flowed into the liquid passage. A pressure profile is controlled to provide a positive pressure difference in the upstream portion and a negative pressure difference in the downstream portion. The positive pressure difference urges the liquid in the liquid passage through the porous material and into the upstream portion of the reactant passage.

The method can also include controlling the pressure profile in response to at least one measured property of the reactant and or the liquid, and controlling the pressure profile in such a way as to provide a liquid outlet pressure that is below an ambient pressure at a liquid passage outlet.

The method can include providing a pressure profile with either a smooth or a stepped change. The stepped change can be implemented with a discontinuity in the liquid flow, such as flowing the liquid through a flow restrictor, or by providing two liquid passages. One liquid passage can be adjacent the upstream portion and have a first liquid stream at a first liquid pressure, and a second liquid passage can be adjacent the downstream portion and have a second liquid stream with a, lower, second liquid pressure. One of the liquid passages can be dead-ended, and the pressure profile can be controlled by measuring the flow rate of liquid into the dead ended passage.

A fuel cell power plant is disclosed that is operable with a first reactant, a second reactant, and a liquid coolant, having an improved humidification system. The power plant has a membrane electrode assembly with a first electrode and a second electrode. It further has a reactant distribution plate with a porous material that is liquid permeable, adjacent the membrane electrode assembly, with a first reactant channel facing the first electrode. The plate also has a liquid channel separated from the first reactant channel by the porous material. The first reactant channel has an upstream portion, a downstream portion, and a transition portion in between the upstream and downstream portions. The reactant distribution plate has a step means for providing a stepped change in a pressure profile, and the stepped means is positioned in the reactant distribution plate so that the stepped change in the pressure profile occurs adjacent the transition portion. The transition portion can be adjacent an edge of an active area of the membrane electrode assembly.

The porous material can be hydrophilic with a maximum pore size of less than about 10 microns. The plate can comprises a central layer made with the porous material, a first outer layer, and a second outer layer, wherein the first outer layer and the second outer layer each have an outer average pore size that is larger than an average pore size of the central layer.

The reactant distribution plate can have a cathode layer, an oppositely disposed anode layer, and a middle layer between the cathode layer and the anode layer. The first reactant channel is found in the cathode layer, a second reactant channel is found in the anode layer, and the liquid channel is found in the middle layer and separated from the first and second reactant channels by the porous material.

The fuel cell power plant can include a means for controlling a pressure profile in response to a measured property of at least one of the coolant, the first reactant, and the second reactant.

A method is disclosed for operating a fuel cell power plant having a membrane electrode assembly ("MEA") with an active area and a plate adjacent to the MEA. The plate is made with a porous material, and has a reactant channel and a coolant channel. The reactant channel delivers a reactant to the active area and is separated from the coolant channel by the porous material. The method includes flowing a reactant into the reactant channel, flowing a coolant into the coolant channel, providing a positive pressure difference in an upstream portion of the reactant channel to create an enhanced humidification zone, providing a neutral pressure difference in a transition portion of the reactant channel, and providing a negative pressure difference in a downstream portion of the reactant channel.

The neutral pressure difference can be adjacent an edge of the active area. The coolant can be flowed through a coolant inlet region at a first temperature and into a coolant intermediate region at a second temperature, wherein the second temperature is lower than the first temperature, and flowing the reactant through an enhanced condensation zone adjacent the intermediate region. The method can include flowing the coolant through a restrictor after the coolant leaves the coolant inlet region.

MODE(S) FOR CARRYING OUT THE INVENTION

Figure 1:
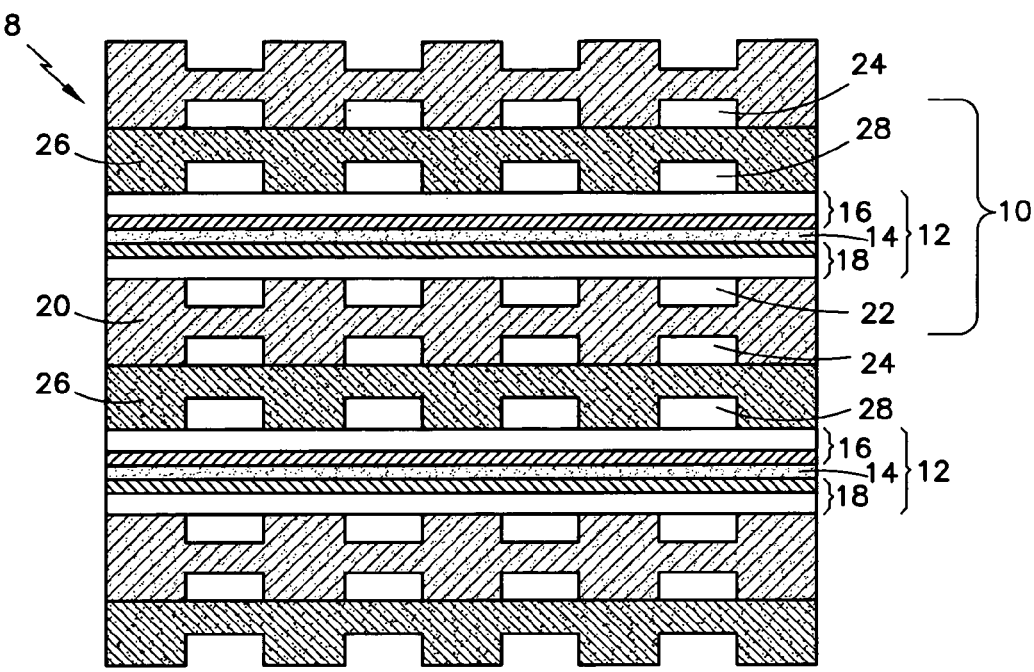
FIG. 1 is a cross sectional end view of the internal arrangement in a CSA.

FIG. 1 shows a portion of a cell stack assembly ("CSA") (8) having at least one fuel cell unit (10). The fuel cell unit can have a membrane electrode assembly ("MEA") (12), a first or cathode side reactant distribution plate (20), and a second or anode side reactant distribution plate (26). The MEA has a proton exchange membrane ("PEM") (14) between an anode electrode (16) and a cathode electrode (18). The electrodes can be of designs known to those skilled in the art, and may comprise one or more layers of material depending upon the needs of a specific fuel cell design. The first distribution plate (20) can be positioned adjacent the cathode (18), with oxidant flow passages (22) on a surface facing the cathode and coolant flow passages (24) located on the opposite surface of the plate. The second distribution plate (26) is positioned adjacent the anode (16), and can have fuel flow passages (28) on the surface facing the anode. The plate (26) can be made of a conductive, solid or porous carbon material. While the cross sectional areas of the oxidant, fuel, and coolant passages are shown to be about the same in FIG. 1, they can be of different sizes and varied as necessary to aid in controlling the pressure drops of the reactants and coolant necessary or desirable for a given fuel cell power plant design.

Plate (20) can be made of a liquid permeable, conductive, porous material, such as a porous carbon or graphite based plate. The oxidant passage (22) and the coolant passage (24) are separated by the porous material of the plate (20). Preferably, the conductive porous plate (20) is hydrophilic to facilitate filling the pores with water, and if there is a pressure difference between the coolant water and the oxidant, the water can migrate through the plate via the pores. However, the water filled pores provide a wet-seal to prevent the gaseous reactants from migrating through the plate. The bubble pressure (i.e. a pressure which can force gas through the water filled plate) can be varied as desired to suit the needs of a specific fuel cell design. The bubble pressure can vary according to a number of parameters, including pore size. In a system using a bubble pressure of about 10 kPa, for example, it is believed that the maximum pore size should typically be no greater than about 10 microns.

Figure 2:
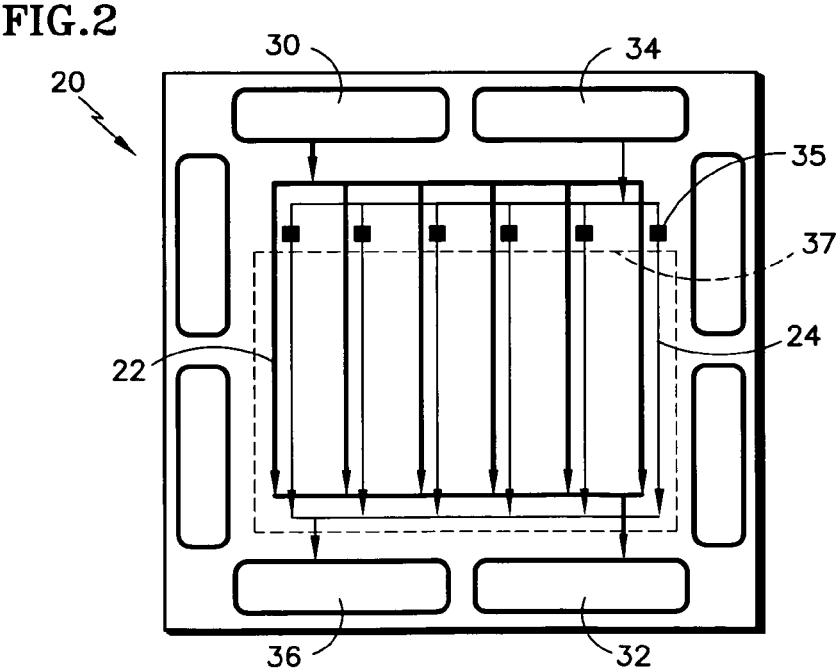
FIG. 2 is a partially schematic top view of a reactant distribution plate with coolant and oxidant channels that are straight and parallel.

FIG. 2 shows a distribution plate (20) with oxidant flow passages or channels (22) that can be straight and parallel, and they can receive the oxidant (e.g., oxygen or air) from an oxidant inlet manifold (30) and expel oxidant into an oxidant outlet manifold (32). The coolant flow passages or channels (24) can also be straight and parallel, and they can receive coolant from a coolant inlet manifold (34) and expel coolant into a coolant outlet manifold (36). Depending upon the needs of a particular fuel cell power plant design, a flow restrictor (35) may optionally be placed in each of the coolant channels, and the flow restrictor may be placed adjacent the edge of the MEA active area (37).

The oxidant channels and coolant channels in FIG. 2 are arranged for co-flow operation, that is, where the oxidant and coolant move in the same direction through their respective flow channels. When the oxidant enters the inlet manifold (30) it can be relatively dry, particularly if it has not been treated by an external humidifier. As the oxidant proceeds through the oxidant passage (22), it will typically begin to encounter liquid water that has been produced by the electrochemical reaction. Thus, a problem that may be encountered in this type of arrangement is a water imbalance, where insufficient moisture near the inlet can dry the membrane, and excess water near the outlet can flood the electrode.

Figure 3:
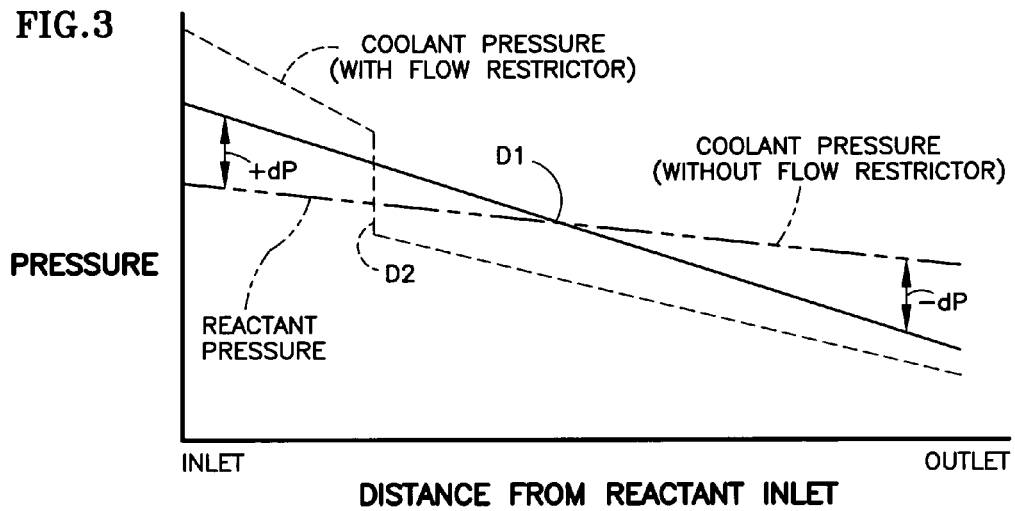
FIG. 3 graphically shows the pressure profile between the oxidant and coolant pressures, for the embodiments of FIGS. 1 and 2.

FIG. 3 shows two pressure profiles that can be utilized to alleviate the water imbalance. The term "pressure profile" means the relative pressures of the oxidant (or other reactant) and the coolant as measured along the length of the reactant passage. The pressure profile graph is generated by determining the reactant pressure at a point in the reactant channel and the coolant pressure in an adjacent or nearby area of the coolant channel, repeating the process at desired points on the length of the reactant channel, and plotting the results.

In FIG. 3 the oxidant pressure in the reactant channel is shown as a function of the distance from the oxidant inlet. The first pressure profile is for the configuration of FIG. 2 without a flow restrictor (35), and is the relationship between the coolant pressure (phantom line) and the reactant pressure. The second pressure profile is for the configuration of FIG. 2 with the flow restrictor (35), and is the relationship between the coolant pressure (dashed line) and the reactant pressure. In each pressure profile, the coolant pressure is higher than the oxidant pressure near the oxidant channel inlet, yielding a positive pressure difference (+dP). Both the coolant and oxidant undergo pressure drops while moving from their inlets to their outlets, but the pressure drop of the coolant is greater than the pressure drop of the oxidant. Thus, near the oxidant outlet the coolant pressure is lower than the oxidant pressure, yielding a negative pressure difference (−dP).

In the first pressure profile (phantom line) the magnitude of the positive pressure difference (+dP) declines as the coolant and reactant flows move further from their respective inlets, until the pressure difference becomes neutral or "0" at a transition region or portion D1. As the coolant and reactant flows move beyond the transition region the pressure difference becomes negative (−dP), and as the flows continue towards their outlets the magnitude of the negative pressure difference increases. This pressure profile changes in a relatively smooth and linear fashion along the length of the reactant channel, as a result of the smooth and linear changes in the reactant and coolant pressures.

Thus, the transition region or portion separates an upstream (+dP) region of the reactant channel from the downstream (−dP) region of the reactant channel. The transition region can be located as desired depending upon the needs of a particular fuel cell design. The positive pressure difference forces coolant water in the coolant channels (24) to flow through the porous distribution plate (20) and into the upstream portion of oxidant channels (22). This provides a zone with enhanced humidification where the coolant is readily available to humidify the incoming oxidant stream. The negative pressure difference can force water from the downstream portion of the oxidant channels (22) through the porous plate (20) and back into the coolant channels (24), thus removing the excess liquid water that has been generated in the electrochemical reaction and preventing the electrode adjacent the downstream portion of the reactant channel from flooding.

In some applications, it may be desirable to make the enhanced humidification, (+dP) zone as small as possible, since the area may be prone to flooding and therefore unavailable for the electrochemical reaction. If this the case, the membrane near the oxidant inlet region would not need to be part of the active area of the MEA, and could be isolated from the reactant gases by impregnating the electrodes in the MEA with a material such as a polymer. This would prevent the membrane from being exposed to a reactant stream that is not yet humidified, as well as minimize corrosion of the catalyst in areas where there is no fuel.

To facilitate making the enhanced humidification zone as small as possible, it can be desirable to have a step change in the pressure profile, for example by providing a step change in the coolant pressure, rather than having the linear and smoothly changing pressure profile and coolant pressure previously described. This can be accomplished by placing the flow restrictor (35) in the coolant channels adjacent the edge of the MEA active areas (37). The flow restrictor or constriction (35) can be any device or structure that provides a stepped change in the coolant pressure, such as for example by providing a reduced cross-sectional area such as a short throat or necked down portion in the channel, or multiple coolant channels passing through fewer channels for a short distance. The stepped change in the coolant pressure results in a stepped change in the pressure profile from the upstream portion of the reactant passage to the downstream portion of the reactant passage, as shown by the dashed line in FIG. 3. As is also apparent from FIG. 3, the transition region moves closer to the reactant inlet, to D2 on the dashed lines, to correspond with the position of flow restrictor (35) that is placed adjacent the edge of the MEA active area (37).

This water management method and pressure profile can also be used on the fuel or anode (16) side of the MEA. In such instances the reactant distribution plate (26) could be made of a conductive porous material, and could have coolant flow passages (not shown) on the side opposite the fuel flow passages (28). The pressure differences between the fuel (e.g. hydrogen gas) and the coolant can be maintained in the relationship shown in FIG. 3, so that liquid coolant water can be supplied to the fuel flow passages (28) to humidify the fuel in the upstream portion, and so that excess liquid water can be removed from the fuel flow passages (28) in the downstream portion.

Figure 4:
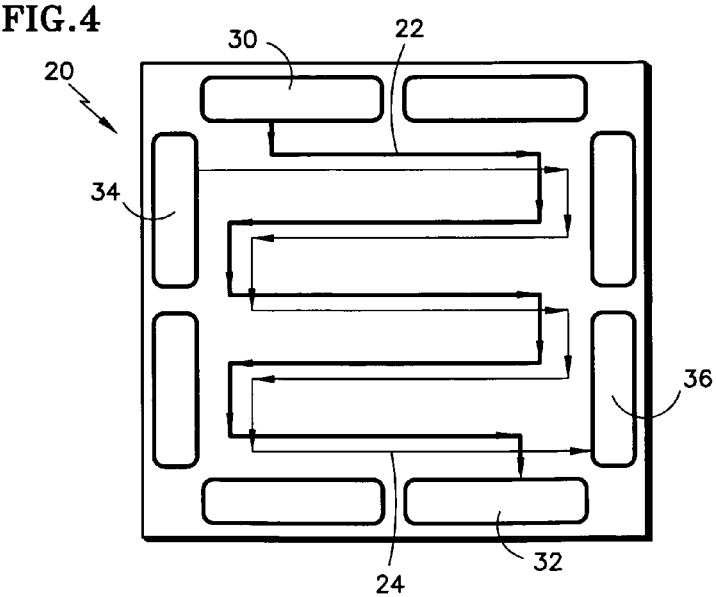
FIG. 4 is a partially schematic top view of a reactant distribution plate with serpentine oxidant and coolant channels arranged for co-flow operation.

FIG. 4 shows an embodiment of a plate (20) with an oxidant flow channel or passage (22) arranged in a serpentine fashion between an oxidant inlet manifold (30) and an oxidant outlet manifold (32). A coolant flow channel or passage (24) is arranged in a serpentine fashion between a coolant inlet manifold (34) and a coolant outlet manifold (36). In the example shown both the oxidant and coolant passages make five passes across the plate (20), but more or less passes can be made depending upon the needs of a particular fuel cell design. The oxidant and the coolant passages are arranged for co-flow operation, that is, where the oxidant and coolant both travel in the same direction. The serpentine pattern can be used to increase both the velocity and the length of the oxidant and coolant flow. This can facilitate higher pressure drops while maintaining a pressure profile with a positive pressure difference in the upstream region and a negative pressure difference in the downstream region.

Figure 5:
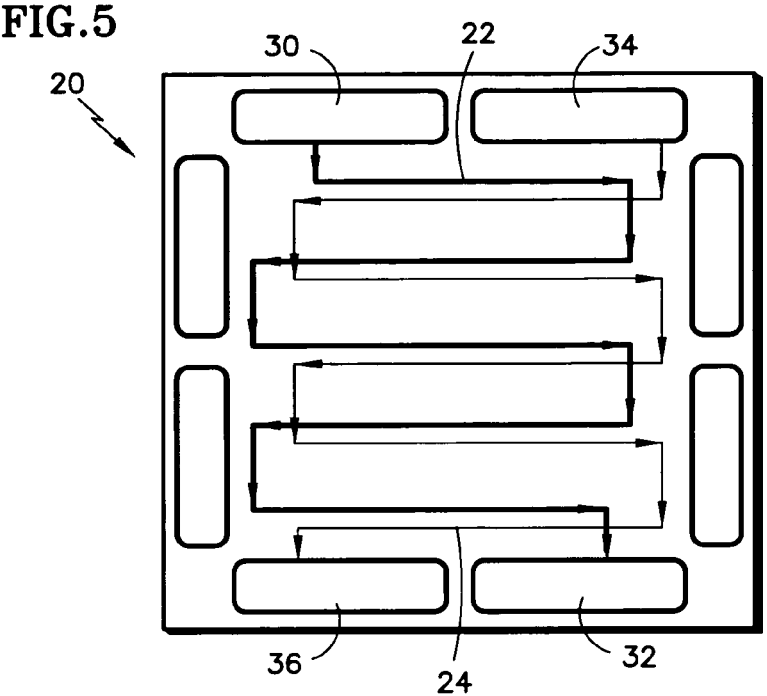
FIG. 5 is a partially schematic top view of a reactant distribution plate with serpentine oxidant and coolant channels arranged for counter-flow operation.

FIG. 5 shows an embodiment of a plate (20) with an oxidant flow channel or passage (22) arranged in a serpentine fashion between an oxidant inlet manifold (30) and an oxidant outlet manifold (32). A coolant flow channel or passage (24) is arranged in a serpentine fashion between a coolant inlet manifold (34) and a coolant outlet manifold (36). In the example shown both the oxidant and coolant passages make five passes across the plate, but more or less passes can be made depending upon the needs of a particular fuel cell design. The oxidant and the coolant passages are arranged for counter-flow operation, that is, the oxidant and coolant travel in opposite directions as shown by the directional arrows. In this configuration the magnitude of (+dP) may increase along some of the portions of the oxidant channel, as opposed to the constant decrease shown in FIG. 3. However, the pressure profile with a positive pressure difference in an upstream portion of the oxidant channel and a negative pressure difference in a downstream portion of the oxidant channel is still maintained.

Figure 6:
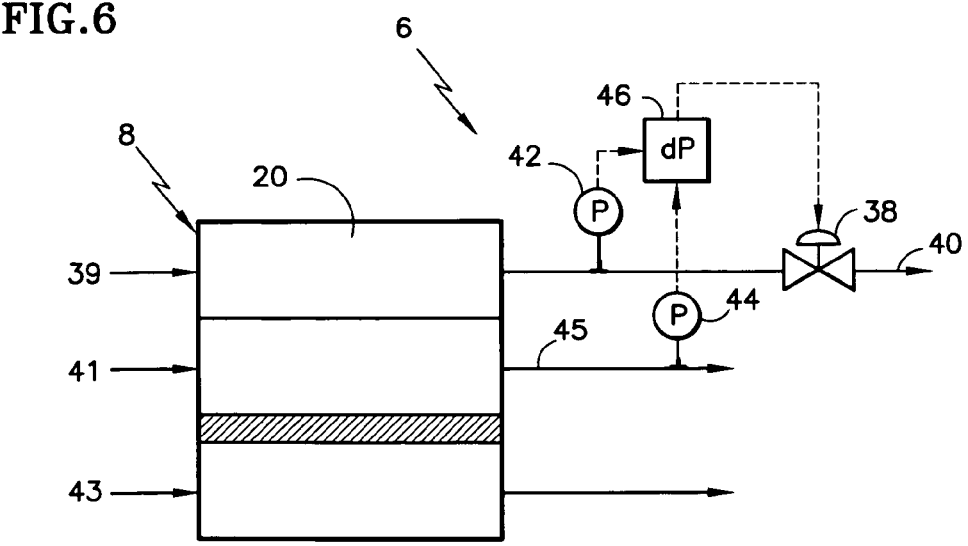
FIG. 6 is a schematic view of a fuel cell unit with a means for controlling the outlet pressure of the coolant.

FIG. 6 is a schematic representation of a fuel cell power plant (6) having a CSA (8) and a hydraulic valve (38). Coolant enters the CSA through a coolant inlet line (39), oxidant enters through an oxidant inlet line (41), and fuel enters through a fuel inlet line (43). The valve (38) can be installed in the coolant water exhaust line (40) to control the outlet pressure of the coolant. The valve (38) can be activated or controlled in response to outputs from a gauge that measures a property of the coolant, such as a water pressure gauge (42) installed in the coolant exhaust line. The valve can also be activated or controlled in response to outputs from a gauge that measures a property of the oxidant, such a gas pressure gage (44) installed in the oxidant exhaust line (45). If desired, the valve (38) can be controlled in accordance with a combination of gages that measure both a coolant property and an oxidant or other reactant property. The reading from the different gauges can be compared in a microprocessor (46) to ascertain, for example, the pressure difference between the coolant and oxidant at their respective outlets. If desired, a second pressure control device such as a pneumatic valve (not shown) can be placed in the oxidant exhaust line (45) to control the oxidant outlet pressure, in lieu of or in addition to valve (38) in the coolant line.

Figure 7:
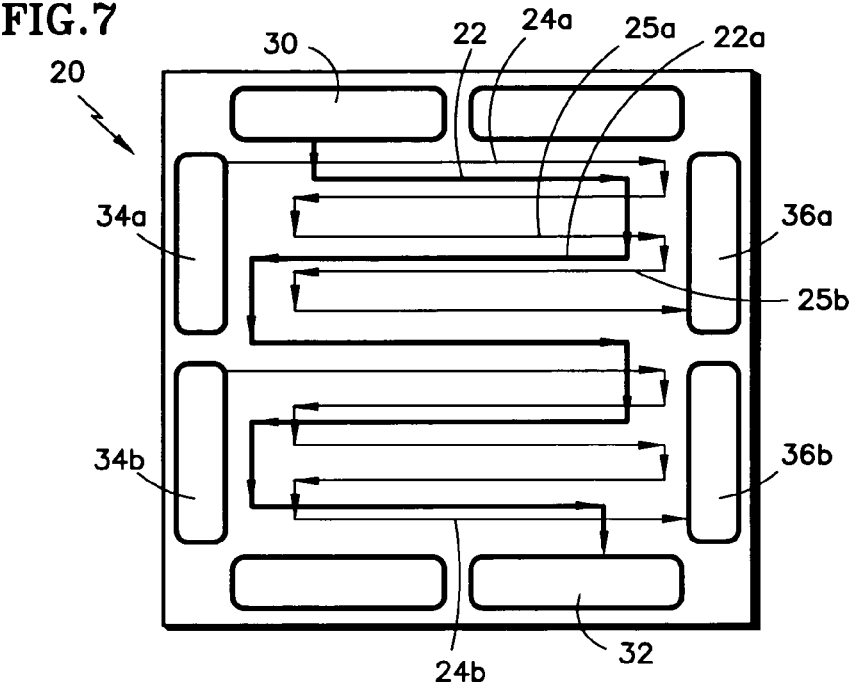
FIG. 7 is a partially schematic top view of a reactant distribution plate with two independent coolant flow passages.

FIG. 7 shows an embodiment of a plate (20) with two independent coolant flow passages (24a) and (24b). The first passage (24a) is arranged in a serpentine fashion between a first coolant inlet manifold (34a) and a first coolant outlet manifold (36a). The second coolant passage (24b) is arranged in a serpentine fashion between a second coolant inlet manifold (34b) and a second coolant outlet manifold (36b). A single oxidant flow passage (22) is arranged in a serpentine fashion between an oxidant inlet manifold (30) and an oxidant outlet manifold (32). The first coolant passage (24a) is located adjacent the upstream portion of the oxidant passage (22), and the second coolant passage (24b) is located adjacent the downstream portion of the oxidant flow passage.

The FIG. 7 embodiment shows each pass of the oxidant channel interleaved between two passes of one of the coolant channels. For example, the oxidant channel pass (22a) is in between coolant passes (25a) and (25b). If necessary or desirable, one of the coolant passes can be located closer to the oxidant pass so as to have a greater impact on the pressure profile relative to the adjacent oxidant channel. Thus, if a co-flow configuration is desired, the coolant passes with flow moving in the same direction as the oxidant can be located closer to the oxidant channel than the coolant pass with flow moving opposite the direction of the oxidant flow. For example, in FIG. 7, the coolant pass (25b) can be placed closer to oxidant pass (22a) to achieve co-flow characteristics.

Figure 8:
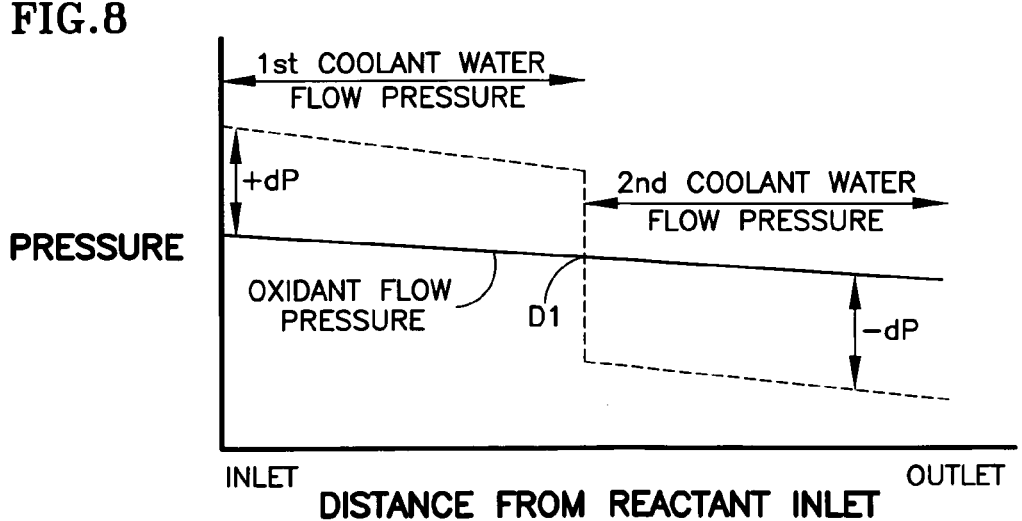
FIG. 8 graphically shows the pressure profile between the coolant and oxidant pressures for the embodiment shown in FIG. 7.

FIG. 8 shows the pressure profile, for co-flow operation, between the pressure in the first coolant passage (24a), the second coolant passage (24b), and the oxidant passage (22) of the embodiment shown in FIG. 7. The coolant pressure in the first passage (24a) is higher than the oxidant pressure, thus liquid coolant water is supplied into the upstream portions of the oxidant passage (22), via the porous plate, to humidify the oxidant. The coolant pressure in the second coolant passage (24b) is lower than the oxidant pressure, so excess liquid water in the downstream portion of channel (22) is urged into the coolant channel (24b) via the porous plate. An advantage of this configuration is that the pressures in each coolant passage can be controlled independently of each other, that is, the pressure in one passage may be changed without affecting the pressure in the other passage. The pressure profile shown in FIG. 8 may also be advantageous in applications where a stepped change is desired in the pressure profile.

Figure 9:
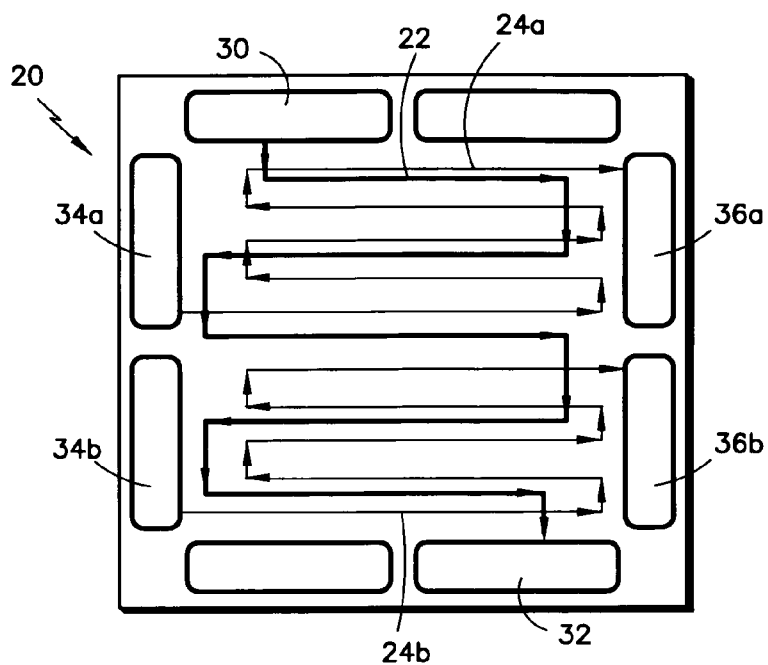
FIG. 9 is a partially schematic top view of a reactant distribution plate with two independent coolant flow passages arranged for counter-flow operation.

FIG. 9 shows an embodiment where first and second coolant passages (24a) and (24b) are arranged to provide counter-flow operation relative to the overall direction of the oxidant flow in passage (22). For counter-flow operation, the coolant passes with flow moving in a direction opposite the oxidant flow can be placed closer to the oxidant passes than the coolant passes with flow moving in the same direction as the oxidant flow. The oxidant passage is arranged in a serpentine fashion between an oxidant inlet manifold (30) and an oxidant outlet manifold (32). The first coolant passage (24a) is arranged with a first coolant inlet manifold (34a) and a first coolant outlet manifold (36a). The second coolant passage (24b) is arranged with a second coolant inlet manifold (34b) and a second coolant outlet manifold (36b).

Figure 10:
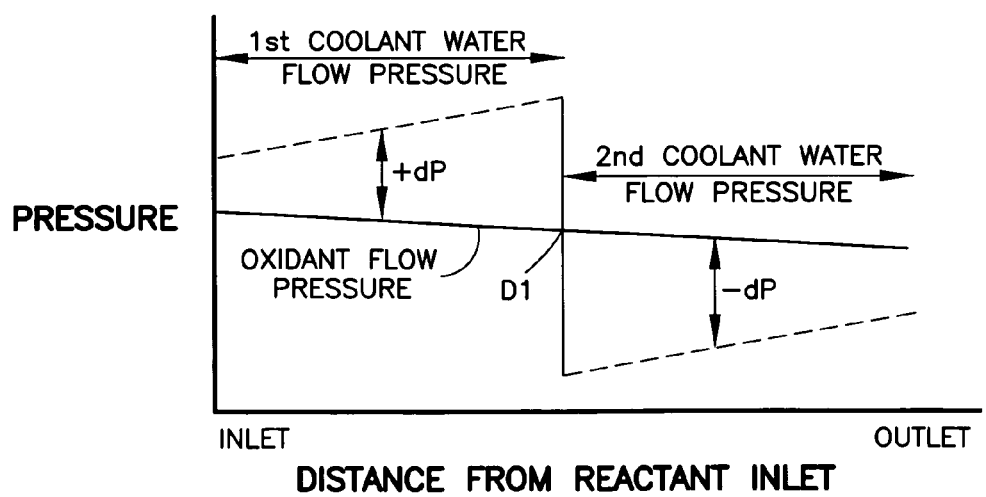
FIG. 10 graphically shows the pressure profile between the coolant and oxidant pressures for the embodiment shown in FIG. 9.

FIG. 10 graphically represents a pressure profile between the pressures in the first coolant passage (24a), the second coolant passage (24b), and the oxidant passage (22) of the embodiment shown in FIG. 9, with counter-flow operation. The magnitude of the positive pressure difference increases in the direction of the oxidant flow in the upstream portion of the oxidant channel, while the magnitude of the negative pressure difference decreases in the direction of the oxidant flow in the downstream portion of the oxidant channel. But a pressure profile with a positive pressure difference in the upstream portion and the negative pressure difference in the down stream portion is still maintained.

Figure 11:
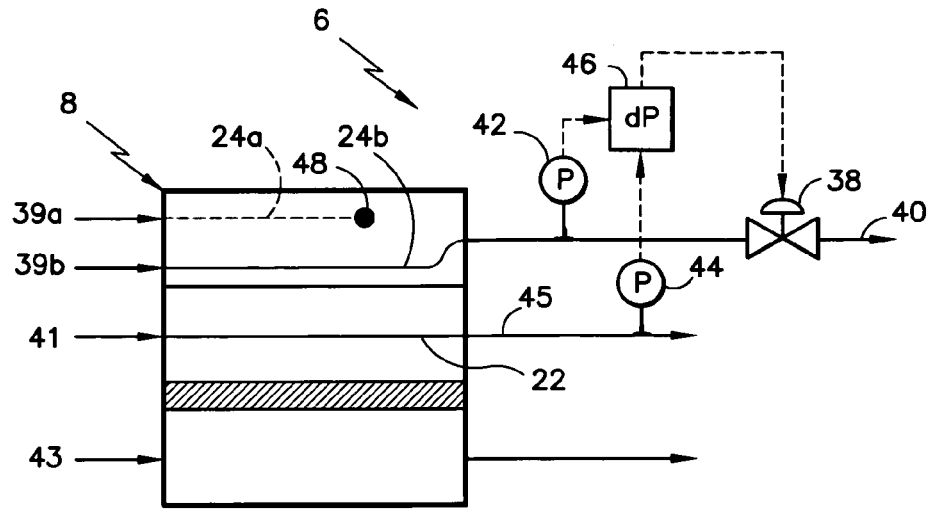
FIG. 11 is a schematic view of a fuel cell unit with two independent coolant channels, one of them being dead-ended.

FIG. 11 schematically shows an embodiment of a fuel cell unit (10) with two independent coolant channels (24a) and (24b) and an oxidant channel (22). The foregoing channels are arranged so that channel (24a) is adjacent an upstream portion of the oxidant channel and channel 24(b) is adjacent a downstream portion of the oxidant channel. Coolant enters the fuel cell unit through coolant inlet lines (39a) and (39b), oxidant enters through an oxidant inlet line (41), and fuel enters through a fuel inlet line (43). Channel (24a) is dead-ended, while channel (24b) extends between inlet and outlet manifolds (not shown). In the dead end configuration, coolant channel (24a) stops within the surrounding plate structure at point (48), rather than emptying into an outlet manifold. In a channel with a dead ended outlet, all of the coolant will typically be forced through the plate material and into the oxidant passages.

Figure 12:
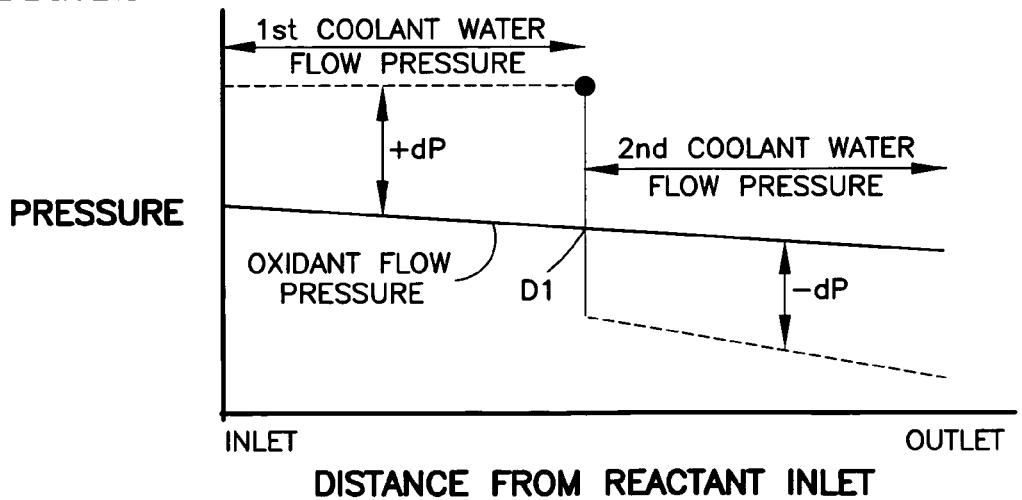
FIG. 12 graphically shows the pressure profile between the coolant and oxidant pressures for the embodiment shown in FIG. 11.

FIG. 12 graphically shows the pressure profile between the coolant pressures in coolant channels (24a) and (24b) and the oxidant pressure in channel (22), of the embodiment in FIG. 11. The coolant pressure is relatively constant in dead-ended channel (24a), and all of the coolant water flows into the oxidant passages (22), through the porous plate, to humidify the upstream portion of the oxidant channels. The dead end configuration can be used if it is desirable to eliminate down stream components such as, for example, exhaust lines and pressure control valves. For example, the flow rate and pressure of the incoming coolant in the dead ended passage can be controlled with a simple metering pump (not shown). However, it could still be desirable to include downstream components on the second coolant channel, which is not dead-ended, as well as the oxidant channel. Such components can include for example a hydraulic valve (38), a coolant water exhaust line (40), a water pressure gage (42), an oxidant pressure gage (44), and a microprocessor (46).

As depicted, the embodiment of FIG. 11 can have two coolant pumps (not shown), one for the coolant entering passage (24a) and one for coolant entering passage (24b). If desired, a single pump can be used. In such an embodiment, the pump provides coolant to passage (24b), and the exhausted coolant from passage (24b) can be circulated back to passage (24a), via a suitable combination of components such as valves and heat exchangers (not shown). This single pump approach can be used in other embodiments that have two or more coolant loops, even if one of the coolant channels is not dead-ended.

Figure 13:
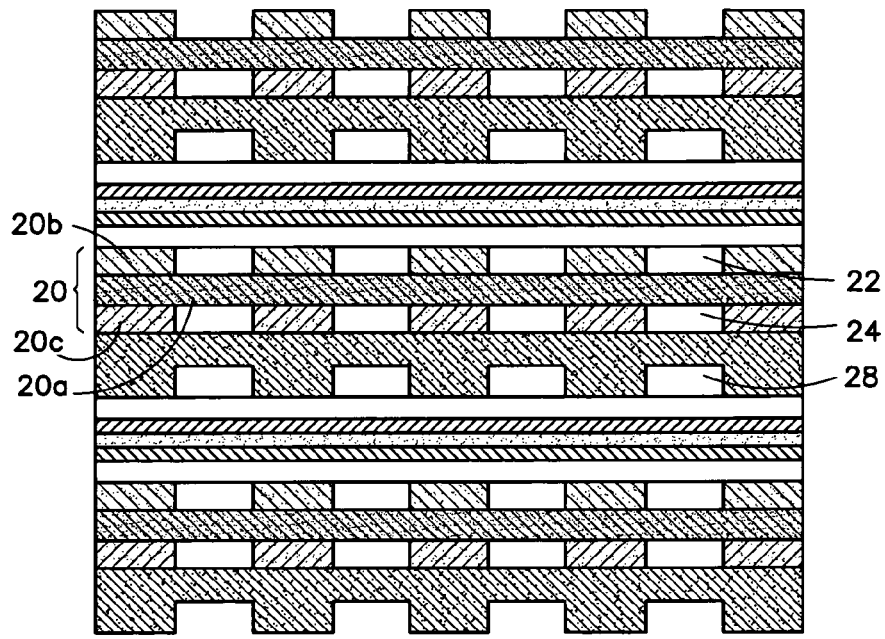
FIG. 13 is a cross sectional end view of a porous reactant distribution plate comprising three layers of material.

FIG. 13 shows an embodiment of a plate (20) that comprises three layers of material. The first or central layer (20a) is a flat plate made with a conductive porous material and is sandwiched between the outer layers (20b) and (20c). The second and third layers are also made of conductive porous materials and can have punched oxidant flow channels (22) and coolant flow channels (24). The pore sizes in layer (20a) can typically average less than 10 microns in systems with bubble pressures of up to about 10 kPa. The pore diameters of the outer layers (20b) and (20c), are larger than the pore diameters in the first layer (20a). This can result in better water permeability through the second and third layers, while maintaining a sufficient wet seal in the first or central layer. This configuration allows the thickness of the outer layers to be increased, for example if necessary for structural reinforcement, without sacrificing favorable water permeability characteristics.

Figure 14:
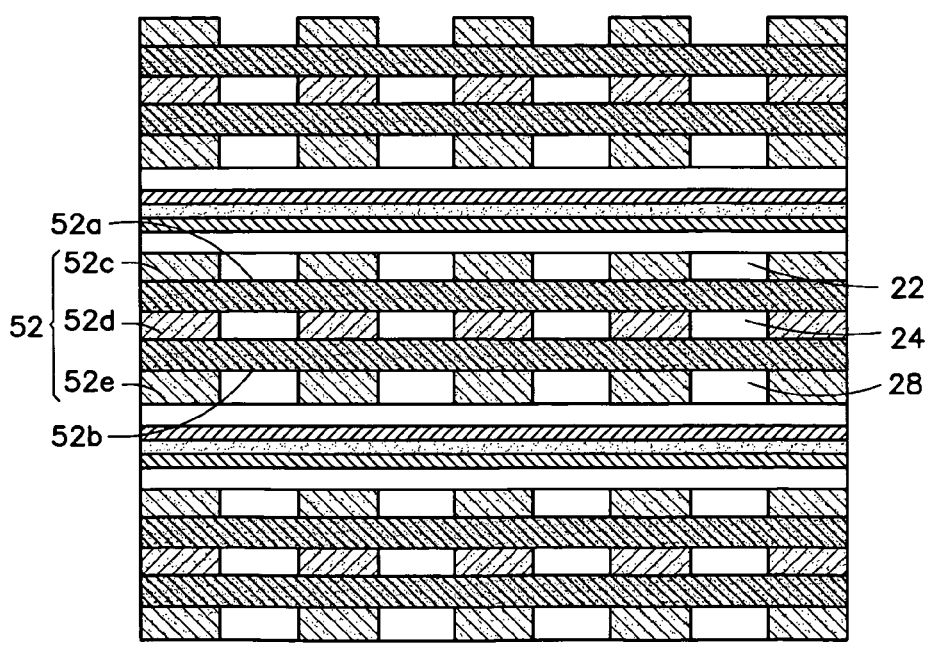
FIG. 14 is a cross sectional end view of a reactant distribution plate made five layers of material.

FIG. 14 shows an embodiment wherein a cathode side reactant distribution plate (see FIG. 1 item 20) and an anode side reactant distribution plate (see FIG. 1 item 26) are integrated into a single plate structure (52). Plate (52) has five layers. Two of the layers (52a) and (52b) are made with conductive porous material. The other three layers are a cathode layer (52c), a middle layer (52d), and an anode layer (52e). These are punched with oxidant channels (22), coolant channels (24), and fuel channels (28), respectively. The use of three plates with punched channels or passages offers shorter manufacturing time, since the two reactant distribution plates are formed as a single unit and the channels do not need to be machined.

Figure 15:
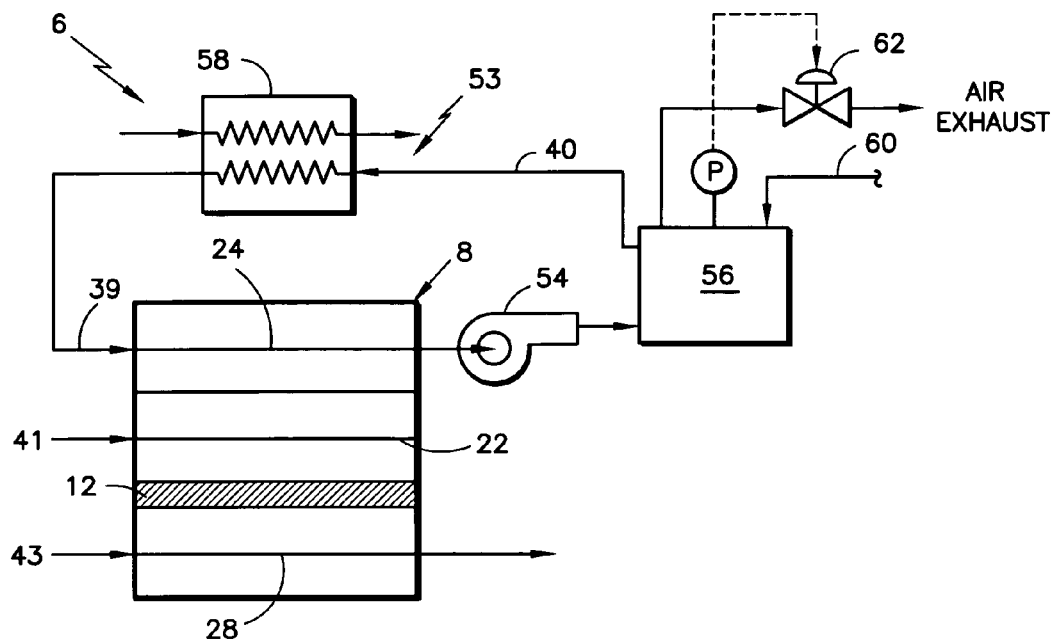
FIG. 15 is a schematic view of a fuel cell unit with a coolant water loop.

FIG. 15 is a schematic representation of a fuel cell power plant (6) having a CSA (8) and a coolant water loop (53). The loop (53) can have a water pump (54), water accumulator (56), and heat exchanger (58) in series in a coolant water exhaust line (40). The accumulator (56) can be provided with a compressed air supply line (60) and a back-pressure valve (62).

Figure 16:
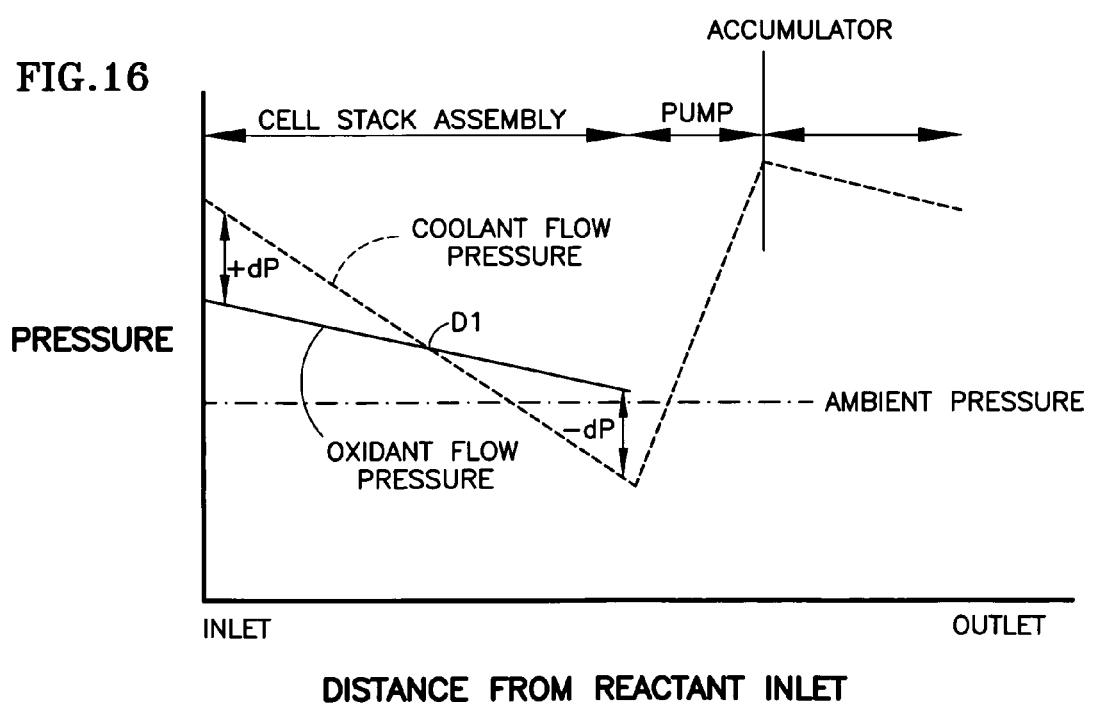
FIG. 16 graphically shows the pressure profile between the coolant and oxidant in the embodiment of FIG. 15.

FIG. 16 graphically shows the pressure profile between the coolant water and oxidant gas in the embodiment of FIG. 15. The water pump (54) creates a low pressure condition to draw coolant from the CSA (8) and keep the pressure at the coolant outlet below ambient pressure. The accumulator (56) is pressurized via the compressed air supply line (60), and its pressure is controlled by the back-pressure valve (62). Water from the accumulator can be fed back into the CSA via the heat exchanger (58) to aid in overall system water management. This configuration realizes a pressure profile with a (+dP) in the upstream portion of the oxidant channel and a (−dP) in the downstream portion of the oxidant channel, which are separated by the transition portion at point D1. This embodiment can reduce the required oxidant inlet pressure requirement, thus reducing losses resulting from parasitic power requirements.

Figure 17:
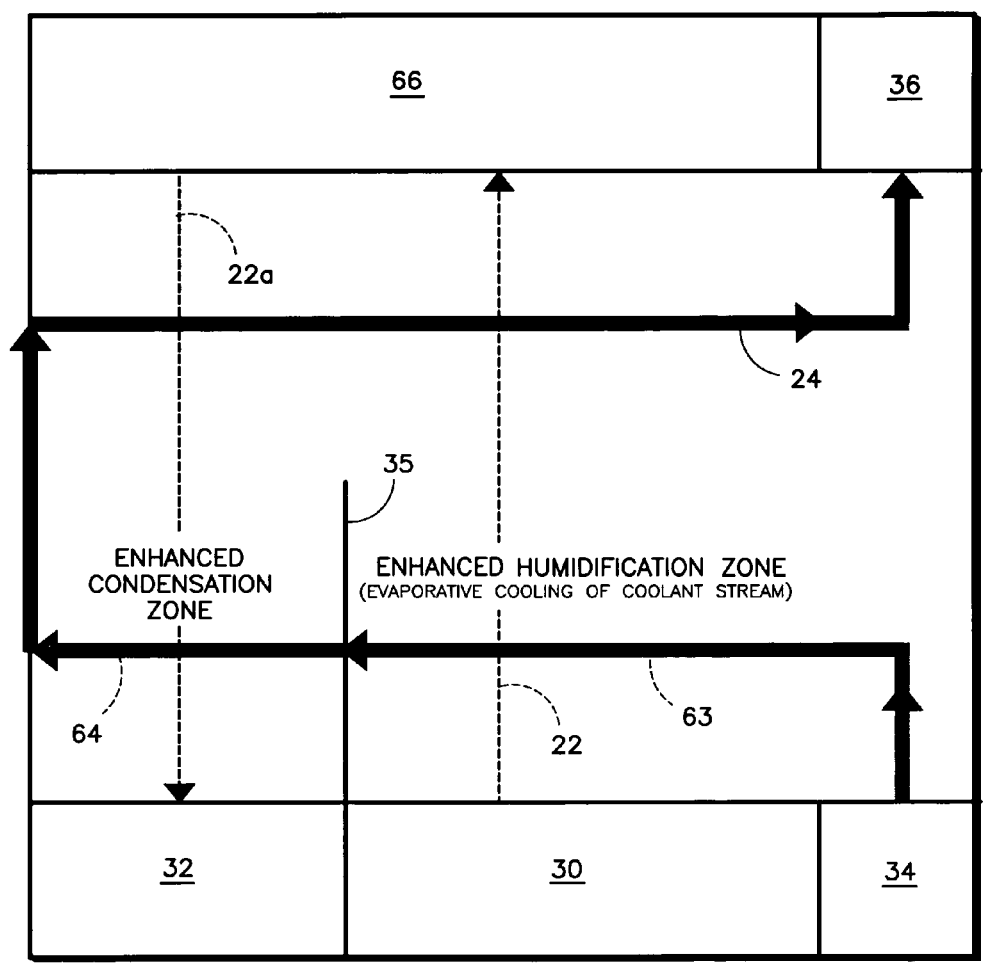
FIG. 17 is a schematic top view of a reactant distribution plate having a flow restrictor in a coolant passage.

FIG. 17 is a schematic view of an embodiment of a plate (20) with a coolant channel (24) provided with a flow restrictor (35). The coolant channel makes two passes across the plate (20) and extends from a coolant inlet manifold (34) to a coolant outlet manifold (36). Oxidant channel (22) extends from an oxidant inlet manifold (30) to flow reversing manifold (66). Air or oxygen that empties into the flow reversing manifold is carried to oxidant outlet manifold via channel 22a. The flow restrictor (35) is placed at the desired location within the coolant passage, depending upon the size of the enhanced humidification zone that is needed. As shown in FIG. 17, it can be placed nearer to coolant inlet (34) than the outlet (36) to make the upstream, enhanced humidification zone, smaller than the downstream portion of the coolant passage.

An advantage of the embodiment shown in FIG. 17 is that the channel arrangement can provide for enhanced cooling of the oxidant near the oxidant outlet (32). The coolant travels through a coolant inlet region (61) immediately after leaving the coolant inlet manifold (34), which overlays the enhanced humidification zone, and where the coolant evaporates into the relatively dry reactant entering from inlet manifold (30). The evaporation lowers the temperature of the coolant.

Figure 18:
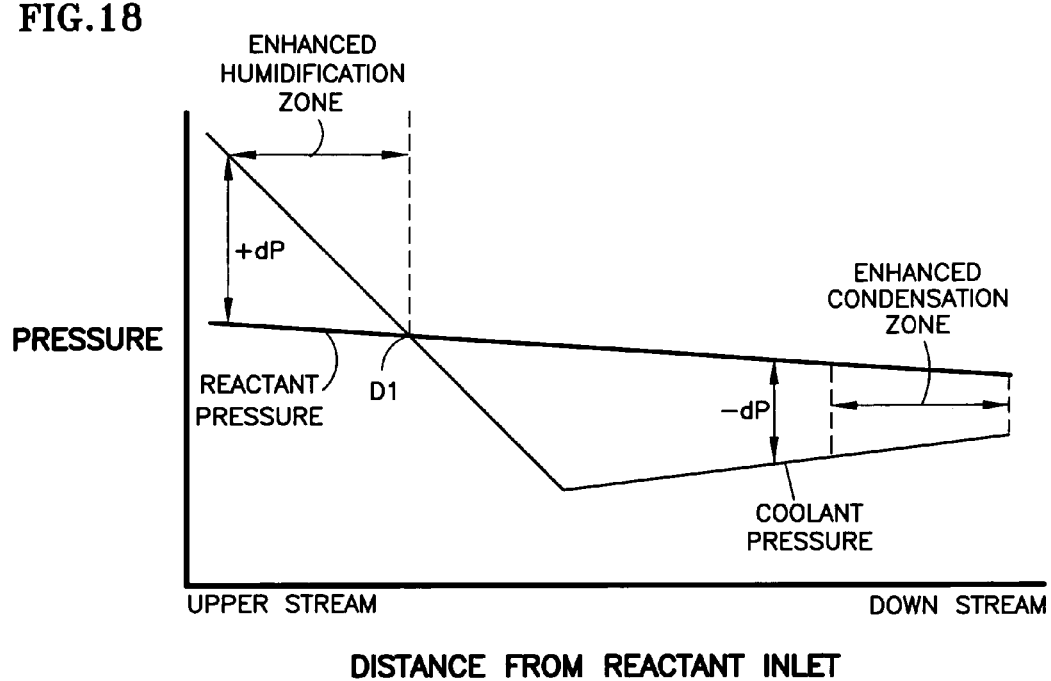
FIG. 18 graphically shows the pressure profile between the coolant and the oxidant in the embodiment of FIG. 17.

The coolant then enters an intermediate region (64) of the coolant channel after passing through flow restrictor (35), where it is cooler than it was when it entered the coolant inlet region due to the evaporative cooling effect. The oxidant and coolant channels are arranged so that the cooler coolant is near the air outlet manifold (32), which can result in enhanced cooling of the air near the oxidant outlet. This can cause more condensation of water vapor out the air stream near the air exit (32), which can be forced back into the coolant loop by a negative pressure difference (−dP), thereby retaining more water in the system and aiding in the maintenance of the water balance of the complete fuel cell power plant. A pressure profile that can be achieved with the embodiment of FIG. 17 is shown in FIG. 18.

Figure 19:
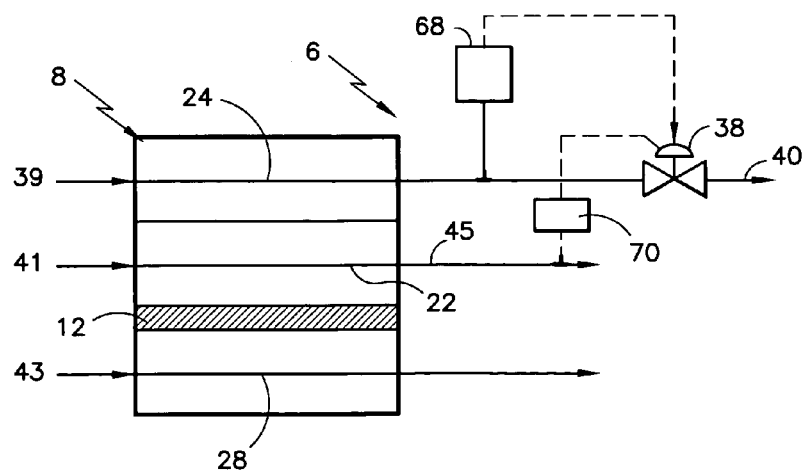
FIG. 19 is a schematic view of a fuel cell unit with a gas sensor and a humidity sensor.

FIG. 19 shows an embodiment of a fuel cell power plant (6) with a gas sensor (68) installed in the coolant exhaust line (40) and a humidity sensor (70) installed in the oxidant exhaust line (45). The humidity sensor may also be placed in the turn manifold (66) shown in FIG. 17. The gas sensor can be, for example, a conductivity sensor or ultrasonic flow meter. The coolant outlet pressure can be adjusted by valve (38) in response to a signal from the gas detection means. So, for example, the magnitude of a negative pressure difference (where coolant pressure is lower than the oxidant pressure) can be decreased if gas is detected in the coolant exhaust. The outlet pressure of the coolant flow can also be controlled based on the signal from the humidity sensor, for example, to increase the magnitude of a positive pressure difference (where coolant pressure is higher than oxidant pressure) if low humidity is detected in the exhausted oxidant. A pneumatic valve (not shown) can also be placed in the oxidant exhaust line (45), and used in a similar way to control the pressure profile in response to a measured property or properties of the oxidant and liquid coolant.

In the operation of a system having features of the present invention, reactants such as hydrogen and air or oxygen can be supplied to inlet manifolds at desired inlet pressures using means known to those skilled in the art, such as compressors, blowers, fans, and compressed air bottles (not shown). Similarly, liquid coolant can be supplied to inlet manifolds at a desired inlet pressure using means known to those skilled in the art, such as pumps (not shown) and accumulators activated by compressed air. The CSA can be designed with reactant and coolant channels sized to provide desired pressure drops. In addition to the channel sizes, means can be placed at the reactant and coolant outlets to control the outlet pressures. Such means can include for example valves to create back-pressures, and pumps or compressors, etc., used to create low pressure conditions at the outlets.

The inlet and outlet pressures of the reactants and the coolant are controlled using various combinations of the foregoing approaches to provide a pressure profile with a positive pressure difference in the upstream portion of the reactant channel and a negative pressure difference in the downstream portion of the reactant channel. Various combinations of the foregoing approaches may be employed to adjust the magnitude of the of positive and negative pressure differences, and to provide a pressure profile that facilitates maintaining the proper water balance within the fuel cell. Such adjustments may be made in response to changing or transient load demands placed upon the fuel cell, as well as measured properties of the reactants and coolant. If necessary or desirable, various combinations of the foregoing means may be connected to and controlled by one or more microprocessor in a manner known to those skilled in the art.

Various modifications and additions may be made to the embodiments described herein without departing from the spirit and scope of the invention. For example, while the embodiments described herein are primarily discussed in terms of an oxidant flow plate, they can also be used on a fuel flow plate. Likewise, while the pressure profile has been primarily described in terms of pressure differences between coolant and oxidant, the pressure profile may also be established between the coolant and the fuel. Further, design details such as, for example, whether to use internal or external manifolds (or a combination of both), and the number of passes used in a flow field, can vary according the needs of a particular fuel cell power plant design. Further, while the coolant has been described herein as being liquid water, it is contemplated that the coolant may also be antifreeze solutions suitable for use in PEM fuel cells.

The invention claimed is:

1. A fuel cell power plant operable with a first reactant, a second reactant, and a liquid coolant, with an improved humidification system comprising:
   a membrane electrode assembly with a first electrode and a second electrode;
   a reactant distribution plate having a porous material that is liquid permeable, adjacent the membrane electrode assembly, with a first reactant channel facing the first electrode, and a liquid coolant channel separated from the first reactant channel by the porous material;
   the first reactant channel having an upstream portion, a downstream portion, and a transition portion between the upstream portion and the downstream portion;
   the reactant distribution plate having a means for providing a stepped change in a pressure profile, the means being positioned in the reactant distribution plate so that the stepped change occurs adjacent the transition portion.

2. The fuel cell power plant of claim 1, wherein the transition portion is adjacent an edge of an active area of the membrane electrode assembly.

3. The fuel cell power plant of claim 2, wherein the porous material is hydrophilic and has a maximum pore size of less than about 10 microns.

4. The fuel cell power plant of claim 3, wherein the reactant distribution plate has a central layer of the porous material, a first outer layer, and a second outer layer, wherein the first outer layer and the second outer layer have an outer average pore size that is larger than a central average pore size of the central layer.

5. The fuel cell power plant of claim 1, wherein the reactant distribution plate has a cathode layer, an oppositely disposed anode layer, and a middle layer between the cathode layer and the anode layer, wherein the first reactant channel is found in the cathode layer, a second reactant channel is found in the anode layer, and the liquid coolant channel is found in the middle layer and separated from the first reactant channel and the second reactant channel by the porous material.

6. The fuel cell power plant of claim 1, comprising a means for controlling a pressure profile in response to a measured property of at least one of the liquid coolant, the first reactant, and the second reactant.

* * * * *